(12) United States Patent
Chiu et al.

(10) Patent No.: US 10,805,611 B2
(45) Date of Patent: Oct. 13, 2020

(54) METHOD AND APPARATUS OF CONSTRAINED SEQUENCE HEADER

(71) Applicant: MEDIATEK INC., Hsin-Chu (TW)

(72) Inventors: Min-Hao Chiu, Hsin-Chu (TW);
Hsiu-Yi Lin, Hsin-Chu (TW);
Chia-yun Cheng, Hsin-Chu (TW);
Chih-Ming Wang, Hsin-Chu (TW);
Yung-Chang Chang, Hsin-Chu (TW)

(73) Assignee: MediaTek Inc., Hsin-Chu (TW)

( * ) Notice: Subject to any disclaimer, the term of this patent is extended or adjusted under 35 U.S.C. 154(b) by 0 days.

(21) Appl. No.: 15/782,886

(22) Filed: Oct. 13, 2017

(65) Prior Publication Data

US 2018/0109796 A1  Apr. 19, 2018

Related U.S. Application Data

(60) Provisional application No. 62/409,415, filed on Oct. 18, 2016.

(51) Int. Cl.
*H04N 19/159* (2014.01)
*H04N 19/577* (2014.01)
*H04N 19/70* (2014.01)
*H04N 19/172* (2014.01)
*H04N 19/105* (2014.01)
*H04N 19/52* (2014.01)

(52) U.S. Cl.
CPC ......... *H04N 19/159* (2014.11); *H04N 19/105* (2014.11); *H04N 19/172* (2014.11); *H04N 19/52* (2014.11); *H04N 19/577* (2014.11); *H04N 19/70* (2014.11)

(58) Field of Classification Search
CPC ............................. H04N 19/70; H04N 19/159
See application file for complete search history.

(56) References Cited

U.S. PATENT DOCUMENTS

| | | | |
|---|---|---|---|
| 2005/0053295 A1* | 3/2005 | Holcomb | H04N 19/46 382/236 |
| 2005/0152448 A1* | 7/2005 | Crinon | H04N 19/70 375/240.01 |

(Continued)

OTHER PUBLICATIONS

"Overview of the Second Generation AVS Video Coding Standard (AVS2)"—Shanshe Wang, Falei Luo, Siwei Ma, DOI:10.3969/j.issn., Feb. 2, 2016 (Year: 2016).*

(Continued)

*Primary Examiner* — Mainul Hasan
(74) *Attorney, Agent, or Firm* — Wolf, Greenfield & Sacks, P.C.

(57) ABSTRACT

A method and apparatus for video encoding or decoding used by a video encoder or decoder respectively. In one method, input data associated with a video sequence are received. A current sequence header for a current picture is determined. Whether the current sequence header corresponds to a first sequence header or a second sequence header is determined. If the current sequence header corresponds to the second sequence header, one or more syntax values of a syntax set associated with the first sequence header are assigned to corresponding one or more syntax values of the syntax set associated with the current sequence header. The current picture is then encoded or decoded according to the current sequence header.

15 Claims, 6 Drawing Sheets

(56) References Cited

U.S. PATENT DOCUMENTS

| | | | |
|---|---|---|---|
| 2005/0152457 A1* | 7/2005 | Regunathan | H04N 19/86 375/240.25 |
| 2006/0029367 A1* | 2/2006 | Kosugi | G11B 27/322 386/241 |
| 2007/0047640 A1* | 3/2007 | Venna | H04N 19/89 375/240.01 |
| 2009/0097559 A1* | 4/2009 | Yang | H04N 19/44 375/240.15 |
| 2009/0175349 A1* | 7/2009 | Ye | H04N 19/70 375/240.23 |
| 2012/0121017 A1* | 5/2012 | Chen | H04N 19/174 375/240.15 |
| 2016/0044532 A1* | 2/2016 | Champel | H04L 65/608 370/329 |

OTHER PUBLICATIONS

"Overview of the Second Generation AYS Video Coding Standard (AVS2)"—Shanshe Wang, Falei Luo, and Siwei Ma; DOI: 10.3969/j.issn. 1673-5188. 2016. 01. 001 (Year: 2016).*

* cited by examiner

| Video Sequence Definition | Descriptor |
|---|---|
| video_sequence() { | |
|   do { | |
|     sequence_header() | |
|     extension_and_user_data(0) | |
|     do { | |
|       if ( next_bits(32) == i_picture_start_code ) | |
|         i_picture_header() | |
|       else | |
|         pbf_picture_header()  — 100 | |
|       extension_and_user_data(1) | |
|       picture_data() | |
|     } while (( next_bits(32) ==pbf_picture_start_code ) || ( next_bits(32) == i_picture_start_code ) ) | |
|   } while ( next_bits(32) != video_sequence_end_code && next_bits(32) != video_edit_code ) | |
|   if ( next_bits(32) == video_sequence_end_code ) | |
|     video_sequence_end_code | f(32) |
|   if ( next_bits(32) == video_edit_code ) | |
|     video_edit_code | f(32) |
| } | |

*Fig. 1*

| Sequence header definition | Descriptor |
|---|---|
| sequence_header() { | |
|     video_sequence_start_code | f(32) |
|     profile_id | u(8) |
|     level_id | u(8) |
|     progressive_sequence | u(1) |
|     field_coded_sequence | u(1) |
|     horizontal_size | u(14) |
|     vertical_size | u(14) |
|     chroma_format | u(2) |
|     sample_precision | u(3) |
|     If ( profile_id == 0x22) { | |
|         encoding_precision | |
|     } | ... |
|     aspect_ratio | u(4) |
|     frame_rate_code | u(4) |
|     bit_rate_lower | u(18) |
|     marker_bit | f(1) |
|     bit_rate_upper | u(12) |
|     low_delay | u(1) |
|     marker_bit | f(1) |
|     bbv_buffer_size | u(18) |
|     lcu_size | u(3) |
|     ... | ... |
| } | |

| Fig. 5A | Fig. 5B |
|---|---|
| TMVP (0,0) | TMVP (0,0) |
| TMVP (0,1) | TMVP (0,1) |
| TMVP (0,2) | TMVP (0,2) |
| TMVP (0,3) | TMVP (0,3) |
| TMVP (0,4) | TMVP (1,0) |
| TMVP (0,5) | TMVP (1,1) |
| TMVP (0,6) | TMVP (1,2) |
| TMVP (0,7) | TMVP (1,3) |
| TMVP (1,0) | TMVP (2,0) |
| TMVP (1,1) | TMVP (2,1) |
| TMVP (1,2) | TMVP (2,2) |
| TMVP (1,3) | TMVP (2,3) |
| TMVP (1,4) | TMVP (3,0) |
| TMVP (1,5) | TMVP (3,1) |
| TMVP (1,6) | TMVP (3,2) |
| TMVP (1,7) | TMVP (3,3) |
| TMVP (2,0) | TMVP (0,4) |
| TMVP (2,1) | TMVP (0,5) |
| TMVP (2,2) | TMVP (0,6) |
| TMVP (2,3) | TMVP (0,7) |
| TMVP (2,4) | TMVP (1,4) |
| TMVP (2,5) | TMVP (1,5) |
| TMVP (2,6) | TMVP (1,6) |
| TMVP (2,7) | TMVP (1,7) |
| TMVP (3,0) | TMVP (2,4) |
| TMVP (3,1) | TMVP (2,5) |
| TMVP (3,2) | TMVP (2,6) |
| TMVP (3,3) | TMVP (2,7) |
| TMVP (3,4) | TMVP (3,4) |
| TMVP (3,5) | TMVP (3,5) |
| TMVP (3,6) | TMVP (3,6) |
| TMVP (3,7) | TMVP (3,7) |

METHOD AND APPARATUS OF CONSTRAINED SEQUENCE HEADER

CROSS REFERENCE TO RELATED APPLICATIONS

The present invention claims priority to U.S. Provisional Patent Application Ser. No. 62/409,415, filed Oct. 18, 2016. The U.S. Provisional patent application is hereby incorporated by reference in its entirety.

FIELD OF THE INVENTION

The present invention relates to video coding system. In particular, the present invention relates to method and apparatus to constrain sequence header in order to avoid possible problems due to difference sequence header values associated with a current picture and a reference picture.

BACKGROUND

Motion estimation is an effective Inter-frame coding technique to exploit temporal redundancy in video sequences. Motion-compensated Inter-frame coding has been widely used in various video coding standards, such as H.264, HEVC (High Efficiency Video Coding) and AVS2. The motion estimation adopted in various coding standards is often a block-based technique, where motion information such as coding mode and motion vector is determined for each macroblock or similar block configuration. In addition, Intra-coding is also adaptively applied, where the picture is processed without reference to any other picture. The Inter-predicted or Intra-predicted residues are usually further processed by transformation, quantization, and entropy coding to generate a compressed video bitstream. For Inter prediction, one or more previous coded pictures are used to derive Inter prediction for the current picture. The previous coded pictures are referred as reference pictures and are stored in Decoded Picture Buffer (DPB).

Figure 1:
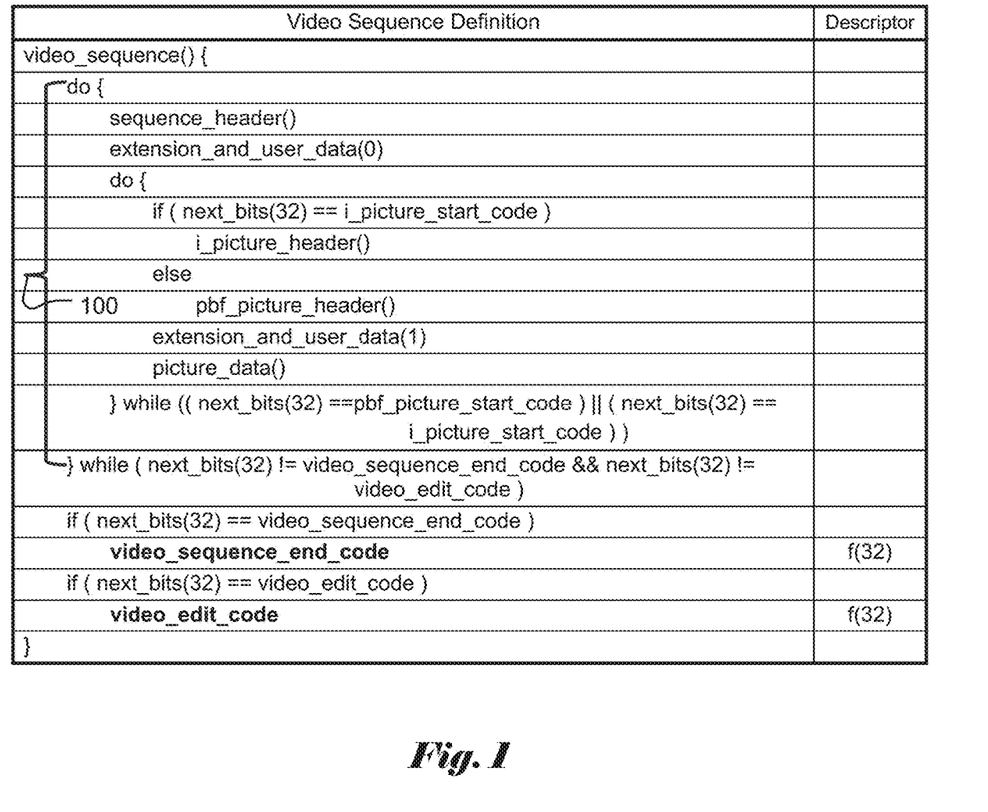
FIG. 1 illustrates an example of video sequence syntax structure as specified in AVS2, where one or more sequence headers are included in the bitstream for a video sequence.
Figure 2:
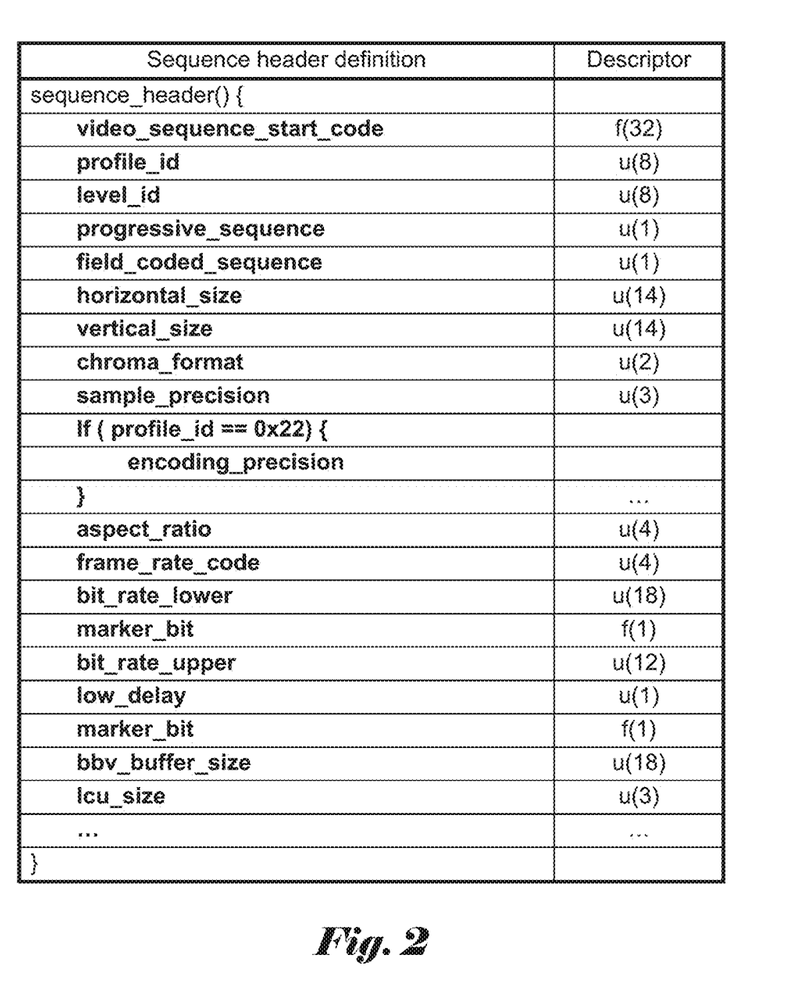
FIG. 2 illustrates an example of video sequence header structure as specified in AVS2, where a list of syntax elements is included.

In various coding standards, the characteristics and coding parameters associated with the compressed video are often indicated in the video bitstream. In particular, various syntax elements related to the characteristics and coding parameters are incorporated in different layers of the video bitstream. For example, one or more sequence headers may be incorporated in a video sequence. FIG. 1 illustrates an example of video sequence syntax structure as specified in AVS2 (Second Generation of Audio Video Coding Standard, by Audio and Video coding standard workgroup of China), where one or more sequence headers are included as indicated by the syntax lines in section 100. Within the do-loop syntax statements indicated by section 100, one or more sequence_header( ) may be included. The structure of sequence_header( ) is shown in FIG. 2, where a list of syntax elements is included. For example, parameters horizontal_size and vertical_size indicate the horizontal and vertical sizes of images associated with the sequence header respectively.

Most coding standards are block-based coding, where an image, a slice or a tile is partitioned into blocks and coding process is applied to each block. Furthermore, the block partition process often starts with a largest coding unit (LCU) and the LCU is partitioned into one or more coding units (CUs) using quadtree partition or binary-tree partition. Other similar image units such as super block (SB) or coding tree block (CTB) are also used. In the sequence header for AVS2, a syntax element indicating the LCU size is included.

For AVS2, syntax element progressive_sequence is included to indicate whether the images associated with this sequence header are progressive or not. Progressive_sequence equal to 1 represents all picture in the sequence are frame picture and progressive_sequence equal to 0 represents all picture in sequence are frame picture or field picture. Similarly, syntax element field_coded_sequence is included in the sequence header, where field_coded_sequence equal to 1 represents all pictures in the sequence are field picture and field_coded_sequence equal to 0 represents all pictures in the sequence are frame picture. If progressive_sequence is equal to 1, field_coded_sequence should be 0. Also, syntax element, bitdepth is included in the sequence header to indicate the bit depth of the pixel data of images associated with the sequence header. Furthermore, syntax element chroma_format is included in the sequence header to indicate the chroma format being used for images associated with the sequence header. For example, the chroma format may correspond to 4:0:0, 4:2:0, 4:2:2 or 4:4:4 format.

According to the current AVS2 standard, multiple sequence headers may exist in a video sequence. For Inter prediction, a current picture may use prediction from one or more previous coded pictures. When multiple sequence headers are allowed for a video sequence, the current picture and a corresponding reference picture may be associated with different sequence headers. If the image characteristics and coding parameters for the current picture and the corresponding reference picture are different, it may increase coding complexity or cause other coding issues. The present invention is intended to provide solutions to overcome such issues.

BRIEF SUMMARY OF THE INVENTION

A method and apparatus for video encoding or decoding used by a video encoder or decoder respectively are disclosed. In one method, input data associated with a video sequence are received. A current sequence header for a current picture is determined. Whether the current sequence header corresponds to a first sequence header or a second sequence header is determined. If the current sequence header corresponds to the second sequence header, one or more syntax values of a syntax set associated with the first sequence header are assigned to corresponding one or more syntax values of the syntax set associated with the current sequence header. The current picture is then encoded or decoded according to the current sequence header. The sequence header may correspond to an AVS2 (Second Generation of Audio Video Coding Standard) sequence header.

The syntax set may comprise progressive_sequence, field_coded_sequence, horizontal_size, vertical_size, bitdepth, lcu_size, chroma_format, or a combination thereof. The first sequence header may correspond to one sequence header first occurring in a video bitstream of the video sequence and the second sequence header may correspond to one sequence header occurring after the first sequence header in the video bitstream of the video sequence. If the current sequence header parsed at the video decoder corresponds to the second sequence header, the video decoder uses the first sequence header for decoding the current picture.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

As mentioned above, for coding systems allowing multiple sequence headers within a video sequence, for an Inter coded current picture, the characteristics and coding parameters of the current picture and the corresponding reference picture may be different if multiple sequence headers are allowed for the video sequence. The different characteristics and coding parameters of the current picture and the corresponding reference picture may increase coding complexity, cause coding difficulty, degrade coding efficiency or a combination of them.

Figure 3:
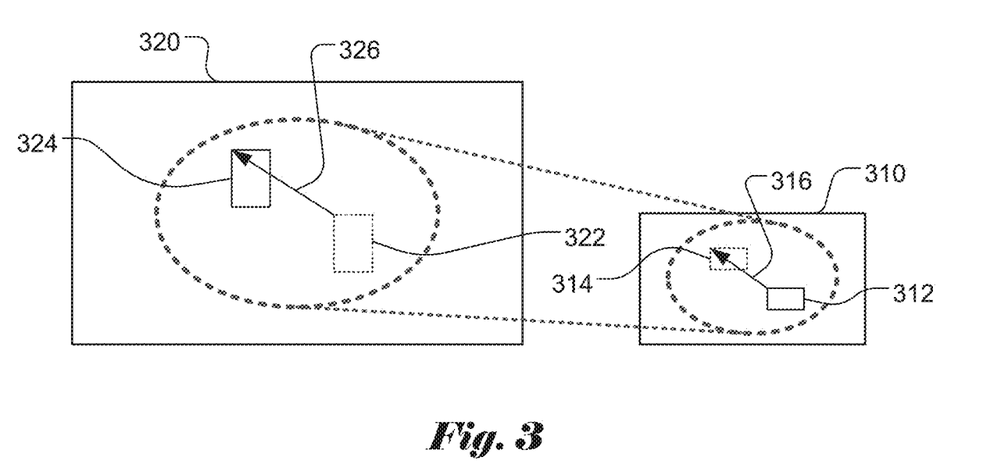
FIG. 3 illustrates an example of rescaling process to handle the different resolutions of the current picture and the corresponding reference picture.

For example, if the resolutions of the current picture and the corresponding reference picture are different, the Inter prediction process will become more complicated since scaling or resampling may be needed to handle the different resolutions. FIG. 3 illustrates an example of rescaling process to handle the different resolutions of the current picture and the corresponding reference picture. The current picture 310 and the corresponding reference picture 320 have different resolution. In the current picture 310, a current block 312 has a motion vector 316 pointing to a corresponding reference block 314. Reference block 314 in the current block 310 represents the corresponding reference block location in the current picture. Due to different resolution in the current picture and the reference picture, the corresponding current block and the reference block in the reference picture have to be determined using proper scaling. The corresponding current block 322 and reference block 324 in the reference picture are determined using scaling. The corresponding motion vector 326 is indicated in FIG. 3.

Figure 4A:
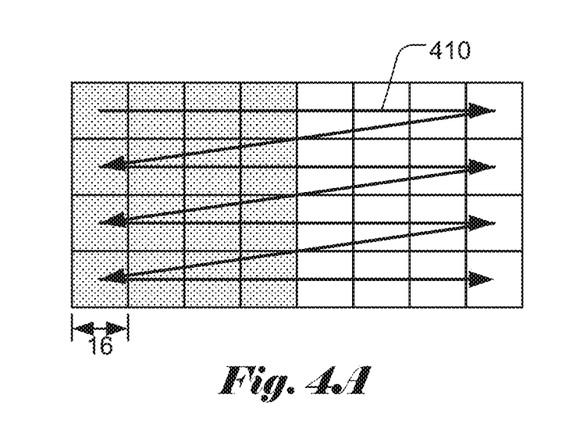
FIG. 4A illustrates an example of motion information storage and the scanning order of TMVP units for a current picture, where each TMVP unit is 16×16 and each LCU is also 16×16.
Figure 4B:
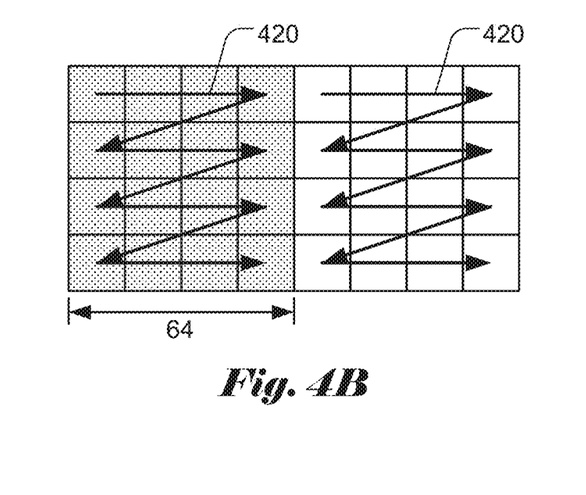
FIG. 4B illustrates an example of motion information storage and the scanning order of TMVP units for a reference picture, where each TMVP unit is 16×16 and each LCU is also 64×64.
Figure 5A:
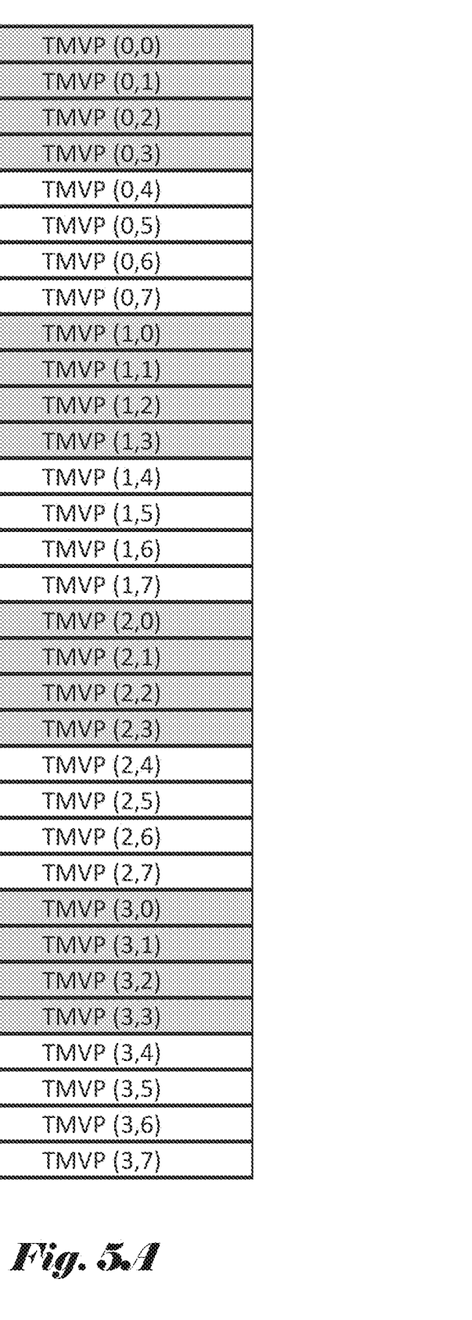
FIG. 5A illustrates an example of motion information storage for TMVP units corresponding to the case of FIG. 4A.
Figure 5B:
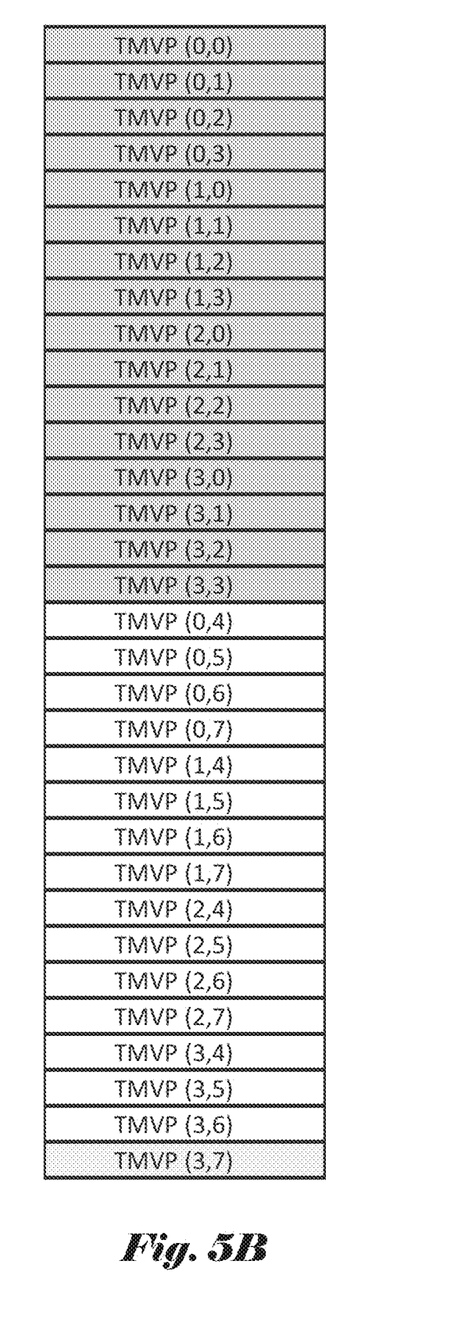
FIG. 5B illustrates an example of motion information storage for TMVP units corresponding to the case of FIG. 4B.

In another example, the LCU size of the current picture is different from the LCU size of the reference picture. In many advanced coding standards (e.g. AVS2), a technique named Temporal Motion Vector Prediction (TMVP) is used to improve coding efficiency for motion vectors. According to TMVP, the motion information in the reference pictures is used as a predictor for a current motion vector. The motion information may include motion vector and reference index. In order to use the TMVP, all motion vectors in a reference picture have to be stored. These motion vectors may be accessed during decoding and cause high bandwidth consumption. If LCU sizes for the current picture and reference picture are different, memory access of TMVP in the reference picture may be non-consecutive, which will cause low efficiency of memory access. For example, TMVP unit may be 16×16, the LCU for the current picture is 16×16 and for the reference picture is 64×64. Therefore, each 16×16 LCU of the current picture corresponds to one TMVP unit and the MVs associated with the TMVP units of the current picture are stored according to the scanning order 410 in FIG. 4A. For the 64×64 LCU in the reference picture, each 64×64 LCU is divided into four 16×16 TMVP units. Accordingly, the scanning order 420 for the reference picture having the 64×64 LCU is shown in FIG. 4B. According to the scanning order 410, the motion information associated with the TMVP units of the current picture is stored in the memory as shown in FIG. 5A. On the other hand, the motion information associated with the TMVP units of the reference picture is stored in the memory as shown in FIG. 5B. According to the scanning order for the current picture, TMVP(0,4) is processed after TMVP(0,3). However, the motion information of the reference picture for TMVP(0,4) and TMVP(0,3) is non-consecutive in TMVP memory for the reference picture. Consequently, the memory access for TMVP units of the reference picture is not efficient.

Figure 6:
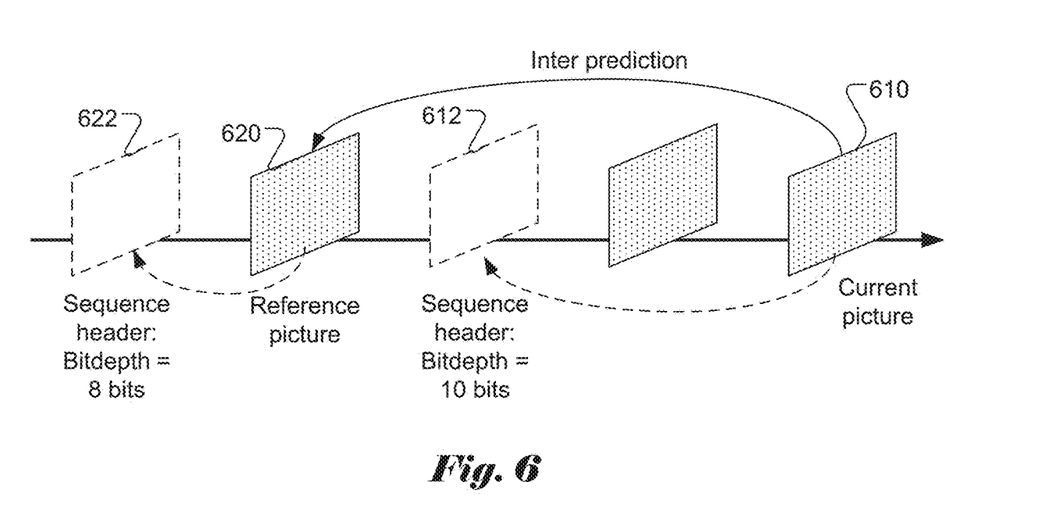
FIG. 6 illustrates an example of different bit depths in the sequence header associated with the current picture and the sequence header associated with the reference picture.

In yet another example, the current picture and a reference picture have different bit depths. FIG. 6 illustrates such an example, where the current picture 610 is Inter coded using reference picture 620. The current picture uses sequence header 612 that has bit depth equal to 10 bits, while the reference picture uses sequence header 622 that has bit depth equal to 8 bits. In this case, the Inter prediction needs to compensate the bit-depth difference between current and reference pictures, which causes the design hard to implement.

Figure 7:
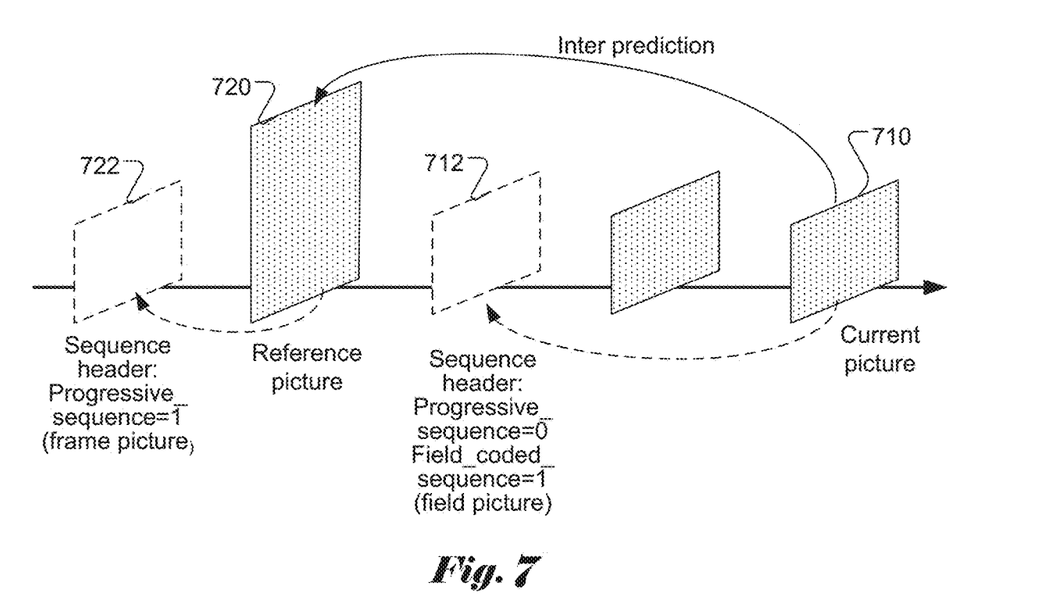
FIG. 7 illustrates an example of different picture type in the sequence header associated with the current picture and the sequence header associated with the reference picture.

In yet another example, the current picture and a reference picture have different picture type. FIG. 7 illustrates such an example, where the current picture 710 is Inter coded using reference picture 720. The current picture uses sequence header 712 that has progressive_sequence equal to 0 and field_coded_sequence equal to 1 (i.e., a field picture). On the other hand, the reference picture uses sequence header 722 that has progressive_sequence equal to 1. In other words, the reference picture is a frame picture.

As illustrated above, when multiple sequence headers are allowed in a video sequence and a current picture and a reference picture are associated with different sequence headers having different characteristics or coding parameters, the coding complexity or memory bandwidth may be increased or the coding efficiency may be decreased. In order to overcome these issues, the present invention discloses constrained sequence headers when multiple sequence headers are allowed. In particular, syntax values are kept the same for all sequence headers to reduce the system complexity and make bitstream random access possible. For example, syntax values for progressive_sequence, field_coded_sequence, horizontal_size, vertical_size, bitdepth, lcu_size and chroma_format are kept the same according to the present invention. There specific syntax elements are intended for illustration purpose. A skilled person may use similar syntax to indicate the same image characteristics or coding parameters. For example, hor_size or pic_width can be used as an equivalence of horizontal_size.

According to the present invention, if a decoder decodes a second sequence header and the syntax value(s) in the second sequence header is different from the syntax value(s) of the first sequence header, the decoder continues to use the syntax value(s) of the first sequence header. The different syntax value(s) in different sequence headers may be caused by transmission error or read/write error.

Figure 8:
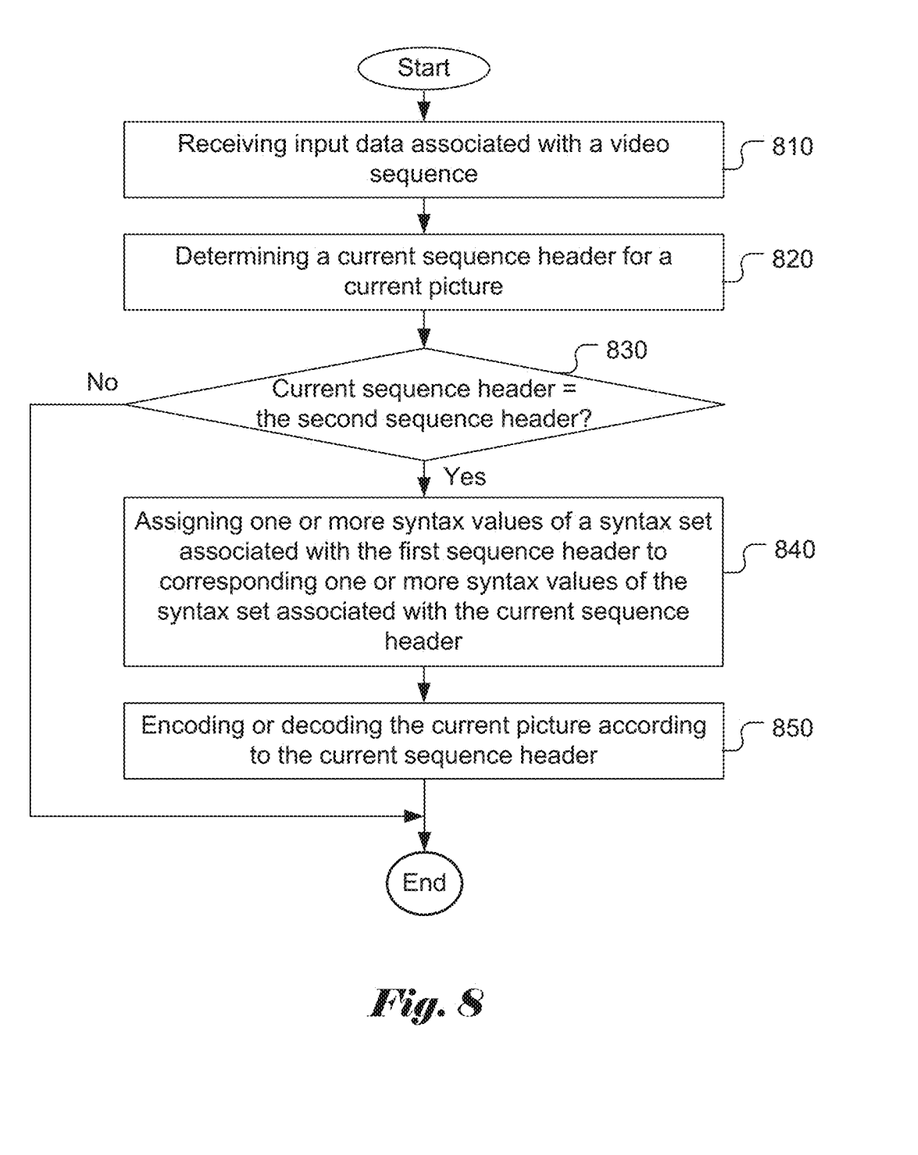
FIG. 8 illustrates the flowchart of an exemplary video coding system incorporating constrained sequence header according to an embodiment of the present invention.

FIG. 8 illustrates the flowchart of an exemplary video coding system incorporating constrained sequence header according to an embodiment of the present invention. The steps shown in the flowchart may be implemented as program codes executable on one or more processors (e.g., one or more CPUs) at the encoder side. The steps shown in the flowchart may also be implemented based hardware such as one or more electronic devices or processors arranged to perform the steps in the flowchart. According to this method, input data associated with a current image are received in step 810. At the encoder side, the input data may correspond to pixel data to be coded. At the decoder side, the input data may correspond to video bitstream to be decoded. A current sequence header for a current picture is determined at step 820. Whether the current sequence header corresponds to the second sequence header is checked at step 830. If the result is "Yes", steps 840 and 850 are performed. Otherwise, steps 840 and 850 (i.e., the "No" path from step 830) are skipped. In step 840, one or more syntax values of a syntax set associated with the first sequence header are assigned to corresponding one or more syntax values of the syntax set associated with the current sequence header. As mentioned earlier, the syntax set may comprise progressive_sequence, field_coded_sequence, horizontal_size, vertical_size, bitdepth, lcu_size, chroma_format, or a combination thereof. In step 850, the current picture is encoded or decoded according to the current sequence header.

The flowchart shown above is intended to illustrate examples of video encoding or decoding process according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more electronic circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video encoding or decoding used by a video encoder or decoder respectively, the method comprising:

receiving input data associated with a video sequence;

determining a current sequence header for a current picture;

determining the current sequence header is a second sequence header by determining whether the current sequence header is a first sequence header or the second sequence header, wherein the first sequence header is a first occurring sequence header in the video sequence and the second sequence header occurs after the first sequence header in the video sequence;

based on the determination that the current sequence header is the second sequence header, assigning one or more syntax values of a syntax set associated with the first sequence header to corresponding one or more syntax values of the syntax set associated with the current sequence header; and encoding or decoding the current picture according to the current sequence header.

2. The method of claim 1, wherein the syntax set comprises progressive_sequence, field_coded_sequence, horizontal_size, vertical_size, bitdepth, lcu_size, chroma_format, or a combination thereof.

3. The method of claim 1, wherein the video decoder uses a plurality of syntax values of the syntax set associated with the first sequence header for decoding the current picture.

4. The method of claim 1, wherein the current sequence header corresponds to an AVS2 (Second Generation of Audio Video Coding Standard) sequence header.

5. An apparatus of video encoding or decoding used by a video encoder or decoder respectively, the apparatus comprising one or more electronic circuits or processors arrange to:
    receive input data associated with a video sequence;
    determine a current sequence header for a current picture;
    determine the current sequence header is a second sequence header by determining whether the current sequence header is a first sequence header or the second sequence header, wherein the first sequence header is a first occurring sequence header in the video sequence and the second sequence header occurs after the first sequence header in the video sequence;
    based on the determination that the current sequence header is the second sequence header, assign one or more syntax values of a syntax set associated with the first sequence header to corresponding one or more syntax values of the syntax set associated with the current sequence header; and
    encode or decoding the current picture according to the current sequence header.

6. The apparatus of claim 5, wherein the syntax set comprises progressive_sequence, field_coded_sequence, horizontal_size, vertical_size, bitdepth, lcu_size, chroma_format, or a combination thereof.

7. The apparatus of claim 5, wherein the video decoder uses a plurality of syntax values of the syntax set associated with the first sequence header for decoding the current picture.

8. The apparatus of claim 5, wherein the current sequence header corresponds to an AVS2 (Second Generation of Audio Video Coding Standard) sequence header.

9. The method of claim 1, wherein assigning the one or more syntax values of the syntax set associated with the first sequence header to corresponding one or more syntax values of the syntax set associated with the current sequence header comprises:
    assigning one or more syntax values of the syntax set associated with the first sequence header that are different than the corresponding one or more syntax values of the syntax set associated with the second sequence header to corresponding one or more syntax values of the syntax set associated with the current sequence header.

10. The apparatus of claim 5, wherein assigning the one or more syntax values of the syntax set associated with the first sequence header to corresponding one or more syntax values of the syntax set associated with the current sequence header comprises:
    assigning one or more syntax values of the syntax set associated with the first sequence header that are different than the corresponding one or more syntax values of the syntax set associated with the second sequence header to corresponding one or more syntax values of the syntax set associated with the current sequence header.

11. At least one non-transitory computer readable storage medium storing machine-readable instructions that, when executed by at least one processor, cause the at least one processor to perform:
    receiving input data associated with a video sequence;
    determining a current sequence header for a current picture;
    determining the current sequence header is a second sequence header by determining whether the current sequence header is a first sequence header or the second sequence header, wherein the first sequence header is a first occurring sequence header in the video sequence and the second sequence header occurs after the first sequence header in the video sequence;
    based on the determination that the current sequence header is the second sequence header, assigning one or more syntax values of a syntax set associated with the first sequence header to corresponding one or more syntax values of the syntax set associated with the current sequence header; and
    encoding or decoding the current picture according to the current sequence header.

12. The at least one non-transitory computer readable storage medium of claim 11, wherein the syntax set comprises progressive_sequence, field_coded_sequence, horizontal_size, vertical_size, bit_depth, lcu_size, chroma_format, or a combination thereof.

13. The at least one non-transitory computer readable storage medium of claim 11, wherein the video decoder uses a plurality of syntax values of the syntax set associated with the first sequence header for decoding the current picture.

14. The at least one non-transitory computer readable storage medium of claim 11, wherein the current sequence header corresponds to an AVS2 (Second Generation of Audio Video Coding Standard).

15. The at least one non-transitory computer readable storage medium of claim 11, wherein assigning the one or more syntax values of the syntax set associated with the first sequence header to corresponding one or more syntax values of the syntax set associated with the current sequence header comprises:
    assigning one or more syntax values of the syntax set associated with the first sequence header that are different than the corresponding one or more syntax values of the syntax set associated with the second sequence header to corresponding one or more syntax values of the syntax set associated with the current sequence header.

\* \* \* \* \*